(12) United States Patent
Nakanishi et al.

(10) Patent No.: US 11,170,738 B2
(45) Date of Patent: Nov. 9, 2021

(54) DISPLAY DEVICE

(71) Applicants: Panasonic Liquid Crystal Display Co., Ltd., Himeji (JP); Pasona Knowledge Partner Inc., Osaka (JP)

(72) Inventors: Hideyuki Nakanishi, Osaka (JP); Toshikazu Koudo, Hyogo (JP); Katsuhiro Kikuchi, Osaka (JP)

(73) Assignees: PANASONIC LIQUID CRYSTAL DISPLAY CO., LTD., Hyogo (JP); PASONA KNOWLEDGE PARTNER INC., Osaka (JP)

( * ) Notice: Subject to any disclaimer, the term of this patent is extended or adjusted under 35 U.S.C. 154(b) by 0 days.

(21) Appl. No.: 16/694,363

(22) Filed: Nov. 25, 2019

(65) Prior Publication Data

US 2020/0175946 A1 Jun. 4, 2020

(30) Foreign Application Priority Data

Nov. 30, 2018 (JP) .............................. JP2018-225228

(51) Int. Cl.
*G09G 5/14* (2006.01)
*G06T 5/20* (2006.01)
*G09G 3/36* (2006.01)
*G09G 5/373* (2006.01)
*G09G 5/10* (2006.01)

(52) U.S. Cl.
CPC ................. *G09G 5/14* (2013.01); *G06T 5/20* (2013.01); *G09G 5/10* (2013.01); *G09G 5/373* (2013.01); *G09G 3/3607* (2013.01); *G09G 2300/023* (2013.01); *G09G 2310/08* (2013.01); *G09G 2320/0276* (2013.01); *G09G 2320/066* (2013.01)

(58) Field of Classification Search
CPC ............ G09G 5/14; G09G 5/10; G09G 5/373; G09G 3/3607; G09G 2300/023; G09G 2310/08; G09G 2320/0276; G09G 2320/066; G06T 5/20
See application file for complete search history.

(56) References Cited

U.S. PATENT DOCUMENTS

| 2009/0051707 | A1 | 2/2009 | Hirata et al. |
| 2016/0206270 | A1* | 7/2016 | Takahashi ............ A61B 6/5258 |
| 2017/0293205 | A1* | 10/2017 | Iwata ........................ G09G 5/02 |
| 2019/0206041 | A1* | 7/2019 | Fang ........................ G06T 7/001 |

FOREIGN PATENT DOCUMENTS

WO 2007/040139 4/2007

* cited by examiner

*Primary Examiner* — Abderrahim Merouan
(74) *Attorney, Agent, or Firm* — Hamre, Schumann, Mueller & Larson, P.C.

(57) ABSTRACT

A display device according to present disclosure comprising: a first display panel that displays a first image; a second display panel disposed on a back surface side of the first display panel to display a second image; and an image processor that acquires input image data and generates first image data corresponding to the first image and second image data corresponding to the second image based on the input image data, wherein the image processor includes a first filter circuit that performs first low-pass filter processing on the input image data, and the first filter circuit reduces a degree of the first low-pass filter processing when input gradation of the input image data is less than first gradation as compared with a case that the input gradation is greater than or equal to the first gradation.

12 Claims, 17 Drawing Sheets

DISPLAY DEVICE

CROSS-REFERENCE TO RELATED APPLICATION

This application claims priority from Japanese application JP 2018-225228, filed Nov. 30, 2018. This Japanese application is incorporated herein by reference.

BACKGROUND

1. Technical Field

The present disclosure relates to a display device.

2. Description of the Related Art

Conventionally, a technique, in which two display panels overlap each other and an image is displayed on each display panel based on input image data, is proposed as a technique of improving contrast of the display device (for example, see Japanese Translation of PCT Publication No. 2007/040139). As a specific example, a color image is displayed on a first display panel disposed on a display surface side of two display panels disposed to overlap each other, and a monochrome image is displayed on a second display panel disposed on a back surface side, thereby improving the contrast. In the display device, low-pass filter processing (smoothing processing) of locally expanding a portion having a high signal level of the input image data by several pixels is performed on a video signal supplied to the second display panel on the back surface side in order to reduce a display defect due to parallax.

SUMMARY

However, in the conventional display device, both the reduction in the display defect due to the parallax and the improvement in the contrast can hardly be achieved. For example, when the low-pass filter processing is performed in a wide pixel region, the contrast is hardly improved even if the display defect due to the parallax can be reduced. Conversely, when the low-pass filter processing is performed in a narrow pixel region, the display defect due to the parallax is hardly reduced even if the contrast can be improved.

The present disclosure has been made in view of the above circumstances, and an object of the present disclosure is to achieve both the reduction in the display defect due to the parallax and the improvement in the contrast in the display device configured by overlapping the plurality of display panels.

To solve the above problem, a display device according to a present disclosure in which a plurality of display panels are disposed to overlap each other and an image is displayed on each of the display panels, the display device comprising: a first display panel that displays a first image; a second display panel disposed on a back surface side of the first display panel to display a second image; and an image processor that acquires input image data and generates first image data corresponding to the first image and second image data corresponding to the second image based on the input image data, wherein the image processor includes a first filter circuit that performs first low-pass filter processing on the input image data, and the first filter circuit reduces a degree of the first low-pass filter processing when input gradation of the input image data is less than first gradation as compared with a case that the input gradation is greater than or equal to the first gradation.

To solve the above problem, a display device according to a present disclosure in which a plurality of display panels are disposed to overlap each other and an image is displayed on each of the display panels, the display device comprising: a first display panel that displays a first image; a second display panel that is disposed on a back surface side of the first display panel to display a second image; and an image processor that acquires input image data and generates first image data corresponding to the first image and second image data corresponding to the second image based on the input image data, wherein the image processor includes a first filter circuit that performs first low-pass filter processing on the input image data, and the first filter circuit reduces an application size of the first low-pass filter processing when input gradation of the input image data is less than first gradation as compared with a case that the input gradation is greater than or equal to the first gradation.

The display device according to the present disclosure can achieve both the reduction in the display defect due to the parallax and the improvement in the contrast in the display device configured by overlapping the plurality of display panels.

DETAILED DESCRIPTION

First Exemplary Embodiment

A first exemplary embodiment of the present disclosure will be described below with reference to the drawings. A display device according to the present exemplary embodiment includes a plurality of display panels that display images, a plurality of drive circuits (a plurality of source drivers and a plurality of gate drivers) that drive the display panels, a plurality of timing controllers that control the driving circuits, an image processor that performs image processing on input image data input from an outside and outputs image data to each of the timing controllers, and a backlight that irradiates the plurality of display panels with light from a back surface side. There is no limitation to a number of display panels, but it is only necessary to provide at least two display panels. When viewed from an observer side, the plurality of display panels are disposed while superimposed on each other in a front-back direction. An image is displayed on each of the display panels. Display device 10 including two display panels will be described below by way of example.

Figure 1:
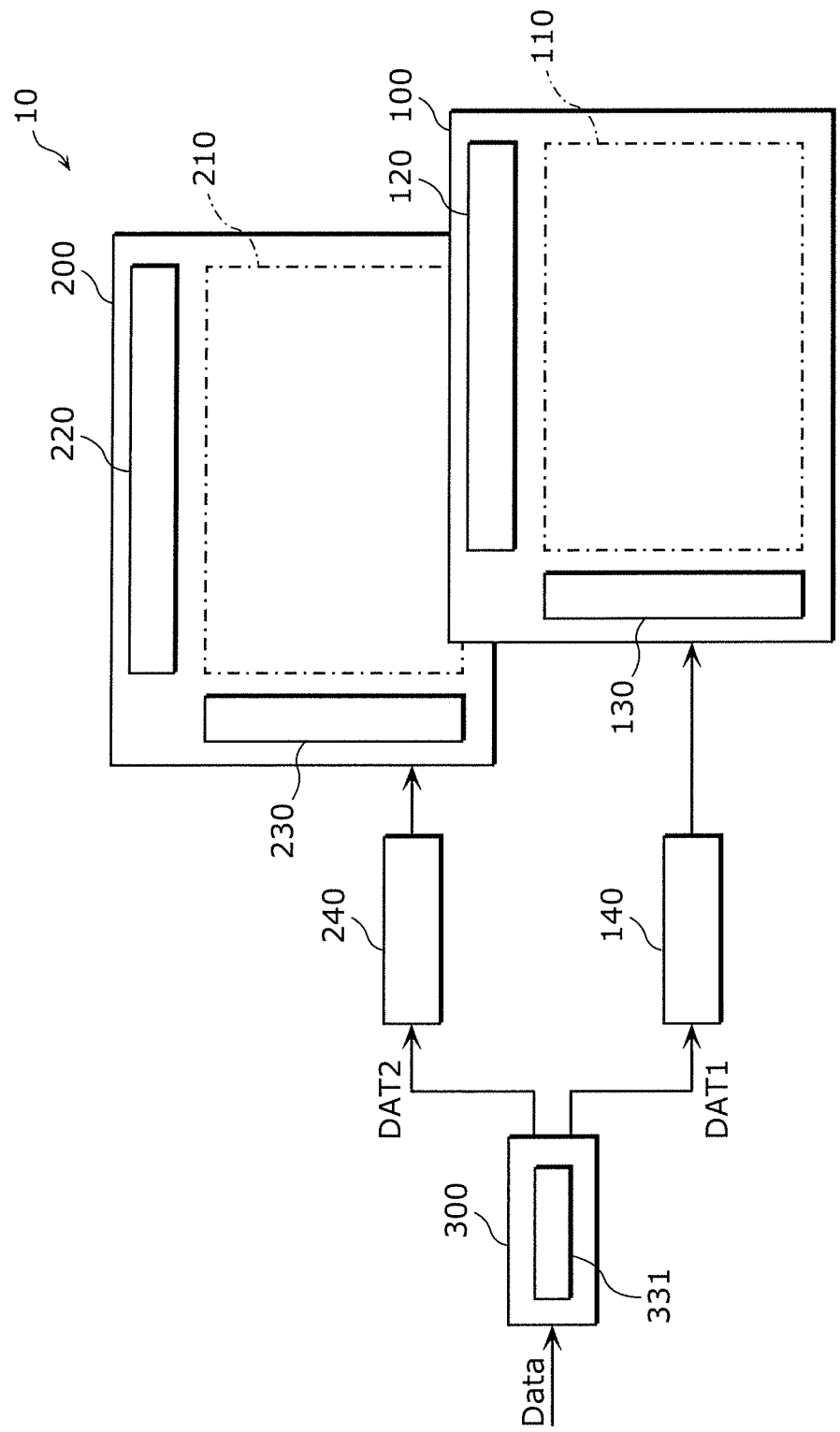
FIG. 1 is a schematic diagram illustrating a configuration of display device according to the first exemplary embodiment.

As illustrated in FIG. 1, the display device of the first exemplary embodiment of the present disclosure includes first display panel 100 that displays a first image, second display panel 200 disposed on a back surface side of first display panel 100 to display a second image, and image processor 300 that acquires input image data Data and generates first image data DAT1 corresponding to the first image and second image data DAT2 corresponding to the second image based on input image data Data.

Image processor 300 includes first filter circuit 331 that performs first low-pass filter processing on input image data Data. First filter circuit 331 reduces a degree of the first low-pass filter processing when input gradation of input image data Data is less than first gradation that is predetermined gradation as compared with a case that the input gradation is greater than or equal to the first gradation.

With this configuration, both the reduction in the display defects due to the parallax and the improvement in the contrast can be achieved. That is, as described above, first filter circuit 331 included in image processor 300 reduces the degree of the first low-pass filter processing when the input gradation of input image data Data is less than the first gradation as compared with the case that the input gradation is greater than or equal to the first gradation, which allows a portion that should be darkly displayed to be darkly displayed. For this reason, the contrast can be improved. First filter circuit 331 increases the degree of the first low-pass filter processing when the input gradation of input image data Data is greater than or equal to the first gradation as compared with the case where the input gradation is less than the first gradation, which allows for the reduction in the display defect due to the parallax. As a result, both the reduction in the display defect due to the parallax and the improvement in the contrast can be achieved.

A more specific configuration of display device 10 of the first exemplary embodiment will be described below with reference to the drawings.

FIG. 1 is a schematic diagram illustrating a configuration of display device 10 of the present exemplary embodiment. As illustrated in FIG. 1, display device 10 includes first display panel 100 disposed on a display surface side of whole display device 10, second display panel 200 disposed closer to the back surface side than first display panel 100, first timing controller 140 that controls first source driver 120 and first gate driver 130 provided in first display panel 100, second timing controller 240 that controls second source driver 220 and second gate driver 230 provided in second display panel 200, and image processor 300 that outputs image data to first timing controller 140 and second timing controller 240. In first display panel 100, the first image (in the present exemplary embodiment, a color image) corresponding to the first image data generated based on the input image data is displayed in first image display region 110. In second display panel 200, the second image (in the present exemplary embodiment, a monochrome image) corresponding to the second image data generated based on the input image data is displayed in second image display region 210. Image processor 300 receives input image data Data transmitted from an external system (not illustrated), performs image processing (to be described later) on input image data Data, outputs first image data DAT1 to first timing controller 140, and outputs second image data DAT2 to second timing controller 240. Image processor 300 also outputs control signals (not illustrated in FIG. 1) such as a synchronizing signal to first timing controller 140 and second timing controller 240. First image data DAT1 is image data for displaying the first image, and second image data DAT2 is image data for displaying the second image. A backlight (not illustrated in FIG. 1) is disposed on the back surface side of second display panel 200. A specific configuration of image processor 300 will be described later. In the present exemplary embodiment, an example in which the first image is the color image will be described. However, the first image may be the monochrome image.

Figure 2:
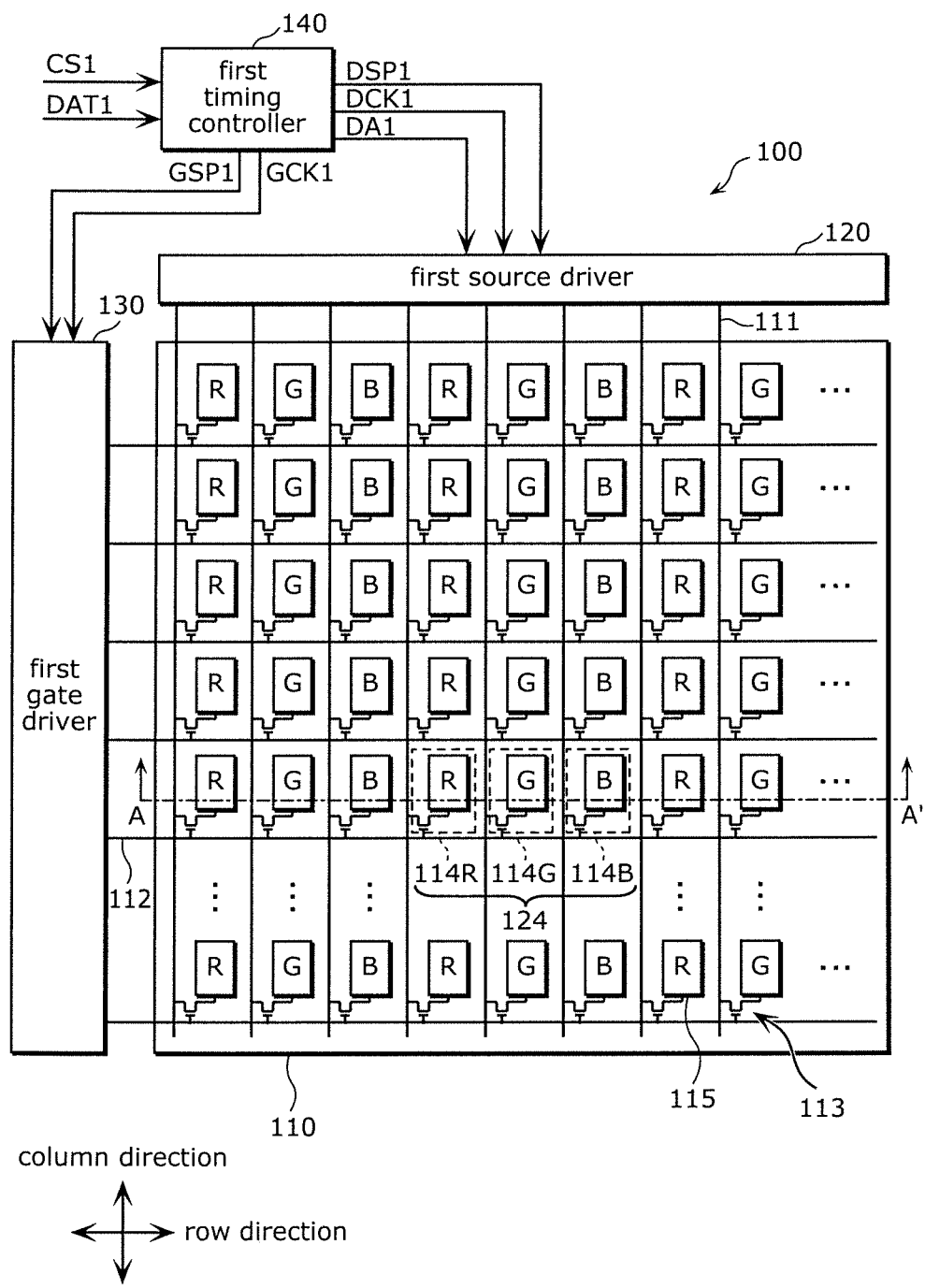
FIG. 2 is a schematic diagram illustrating a configuration of first display panel according to the first exemplary embodiment.
Figure 3:
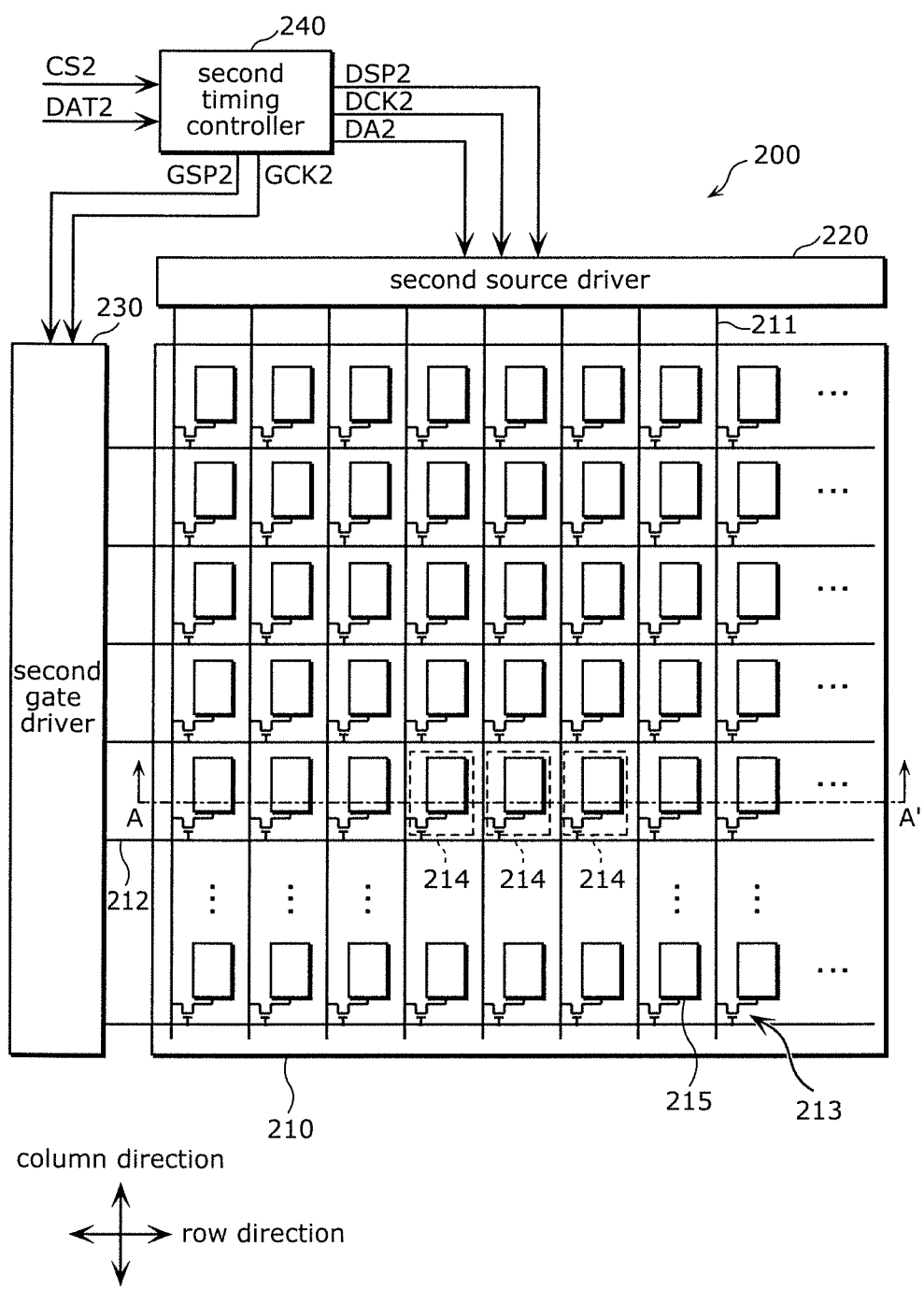
FIG. 3 is a schematic diagram illustrating a configuration of second display panel according to the first exemplary embodiment.
Figure 4:
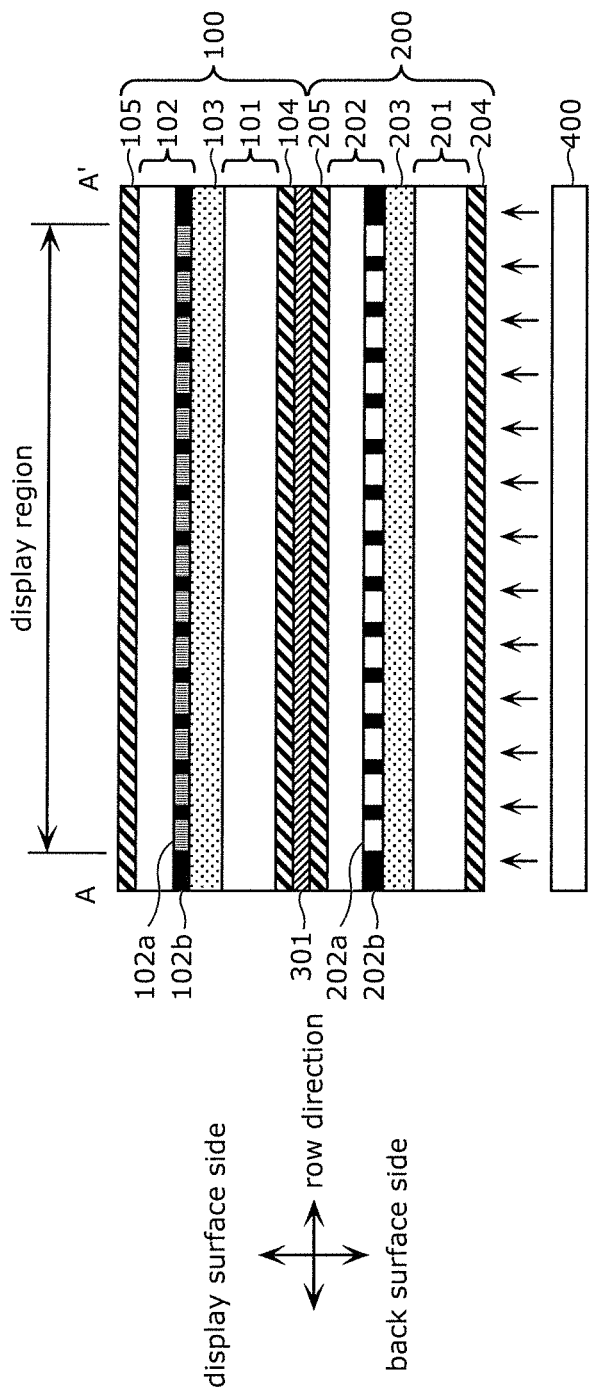
FIG. 4 is a sectional view taken along a line A-A' of FIGS. 2 and 3.

FIG. 2 is a schematic diagram illustrating a configuration of first display panel 100, and FIG. 3 is a schematic diagram illustrating a configuration of second display panel 200. FIG. 4 is a sectional view taken along a line A-A' of FIGS. 2 and 3.

The configuration of first display panel 100 will be described with reference to FIGS. 2 and 4. As illustrated in FIG. 4, first display panel 100 includes thin film transistor substrate (hereinafter, referred to as a TFT substrate) 101 disposed on the back surface side, namely, on the side of backlight 400, color filter substrate (hereinafter, referred to as a CF substrate) 102 that is disposed closer to the display surface side than TFT substrate 101 while opposed to TFT substrate 101, and liquid crystal layer 103 disposed between TFT substrate 101 and CF substrate 102. Polarizing plate 104 is disposed on the back surface side of first display panel 100, namely, on the side of backlight 400, and polarizing plate 105 is disposed on the display surface side.

In TFT substrate 101, as illustrated in FIG. 2, a plurality of data lines 111 extending in a first direction (for example, a column direction) and a plurality of gate lines 112 extending in a second direction (for example, a row direction)

different from the first direction are formed, and thin film transistor (hereinafter, referred to as a TFT) 113 is formed near an intersection between each of the plurality of data lines 111 and each of the plurality of gate lines 112. In planar view of first display panel 100, a region surrounded by two data lines 111 adjacent to each other and two gate lines 112 adjacent to each other is defined as one subpixel 114, and a plurality of subpixels 114 are arranged in a matrix form (in the row and column directions). The plurality of data lines 111 are disposed at equal intervals in the row direction, and the plurality of gate lines 112 are disposed at equal intervals in the column direction. In TFT substrate 101, pixel electrode 115 is formed in each subpixel 114, and one common electrode (not illustrated) common to the plurality of subpixels 114 is formed. A drain electrode constituting TFT 113 is electrically connected to data line 111, a source electrode is electrically connected to pixel electrode 115, and a gate electrode is electrically connected to gate line 112.

As illustrated in FIG. 4, a plurality of colored portions 102a each of which corresponds to subpixel 114 are formed on CF substrate 102. Each colored portion 102a is surrounded by black matrix 102b blocking light transmission. For example, each colored portion 102a is formed into a rectangular shape. The plurality of colored portions 102a includes red portions made of a red material to transmit red light, green portions made of a green material to transmit green light, and blue portions made of a blue material to transmit blue light. The red portion, the green portion, and the blue portion are repeatedly arranged in this order in the row direction, the colored portions having the same color are arranged in the column direction, and black matrix 102b is formed at a boundary portion between colored portions 102a adjacent to each other in the row and column directions. As illustrated in FIG. 2, the plurality of subpixels 114 include red subpixels 114R corresponding to the red portions, green subpixels 114G corresponding to the green portions, and blue subpixels 114B corresponding to the blue portions according to colored portions 102a. In first display panel 100, one pixel 124 is constructed with one red subpixel 114R, one green subpixel 114G, and one blue subpixel 114B, and a plurality of pixels 124 are arranged in a matrix form.

Based on first image data DAT1 and first control signal CS1 (such as a clock signal, a vertical synchronizing signal, and a horizontal synchronizing signal) output from image processor 300, first timing controller 140 generates first image data DA1 and various timing signals (data start pulse DSP1, data clock DCK1, gate start pulse GSP1, and gate clock GCK1) in order to control drive of first source driver 120 and first gate driver 130 (see FIG. 2). First timing controller 140 outputs first image data DA1, data start pulse DSP1, and data clock DCK1 to first source driver 120, and outputs gate start pulse GSP1 and gate clock GCK1 to first gate driver 130.

First source driver 120 outputs a data signal (data voltage) corresponding to first image data DA1 to data lines 111 based on data start pulse DSP1 and data clock DCK1. First gate driver 130 outputs a gate signal (gate voltage) to gate lines 112 based on gate start pulse GSP1 and gate clock GCK1.

The data voltage is supplied from first source driver 120 to each data line 111, and the gate voltage is supplied from first gate driver 130 to each gate line 112. A common voltage is supplied from a common driver (not illustrated) to the common electrode. When the gate voltage (gate-on voltage) is supplied to gate line 112, TFT 113 connected to gate line 112 is turned on, and the data voltage is supplied to pixel electrode 115 through data line 111 connected to TFT 113.

An electric field is generated by a difference between the data voltage supplied to pixel electrode 115 and the common voltage supplied to the common electrode. The liquid crystal is driven by the electric field to control the transmittance of light from backlight 400, thereby displaying the image. In first display panel 100, the color image is displayed by supply of a desired data voltage to data line 111 connected to pixel electrode 115 of each of red subpixel 114R, green subpixel 114G, and blue subpixel 114B. A known configuration can be applied to first display panel 100.

The configuration of second display panel 200 will be described below with reference to FIGS. 3 and 4. As illustrated in FIG. 4, second display panel 200 includes TFT substrate 201 disposed on the back surface side, namely, on the side of backlight 400, CF substrate 202 that is disposed on the display surface side while opposed to TFT substrate 201, and liquid crystal layer 203 disposed between TFT substrate 201 and CF substrate 202. Polarizing plate 204 is disposed on the back surface side of second display panel 200, namely, on the side of backlight 400, and polarizing plate 205 is disposed on the display surface side. Diffusion sheet 301 is disposed between polarizing plate 104 of first display panel 100 and polarizing plate 205 of second display panel 200.

Figure 5:
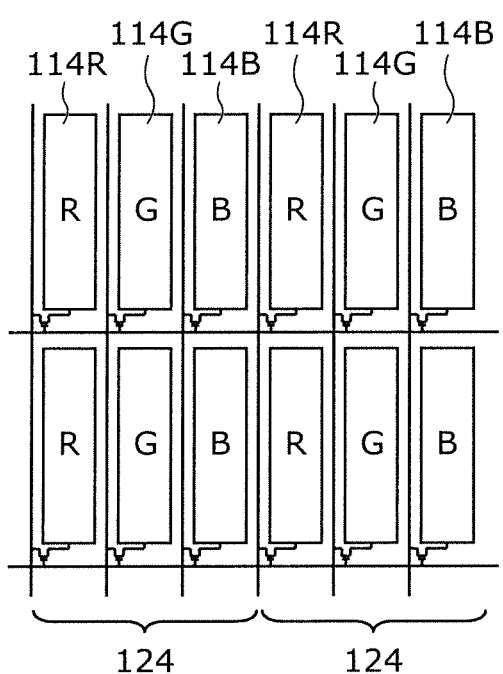
FIG. 5 is a schematic diagram illustrating a configuration of pixel arrangement of the display device according to another example of the first exemplary embodiment.
Figure 5:
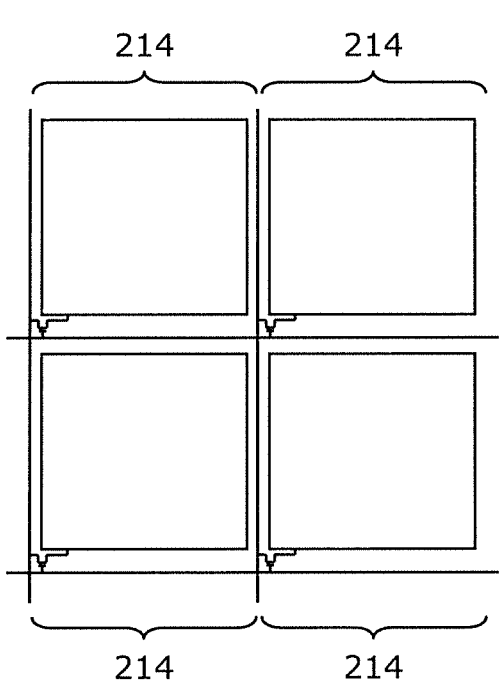

In TFT substrate 201, as illustrated in FIG. 3, a plurality of data lines 211 extending in the column direction, a plurality of gate lines 212 extending in the row direction are formed, and TFT 213 is formed near an intersection between each of the plurality of data lines 211 and each of the plurality of gate lines 212. In planar view of second display panel 200, a region surrounded by two data lines 211 adjacent to each other and two gate lines 212 adjacent to each other is defined as one pixel 214, and a plurality of pixels 214 are arranged in a matrix form (the row direction and the column direction). The plurality of data lines 211 are disposed at equal intervals in the row direction, and the plurality of gate lines 212 are disposed at equal intervals in the column direction. In TFT substrate 201, pixel electrode 215 is formed in each pixel 214, and one common electrode (not illustrated) common to the plurality of pixels 214 is formed. A drain electrode constituting TFT 213 is electrically connected to data line 211, a source electrode is electrically connected to pixel electrode 215, and a gate electrode is electrically connected to gate line 212. Each subpixel 114 of first display panel 100 and each pixel 214 of second display panel 200 are disposed in a one-to-one manner, and overlap each other in planar view. For example, red subpixel 114R, green subpixel 114G and blue subpixel 114B, which constitute pixel 124 in FIG. 2, overlap three respective pixels 214 in FIG. 3 in planar view. As illustrated in FIGS. 5A and 5B, three subpixels 114 (red subpixel 114R, green subpixel 114G, and blue subpixel 114B) (see FIG. 5A) of first display panel 100 may overlap one pixel 214 (see FIG. 5B) of second display panel 200 in planar view.

As illustrated in FIG. 4, in CF substrate 202, black matrix 202b blocking light transmission is formed at a position corresponding to a boundary portion between pixels 214. The colored portion is not formed in region 202a surrounded by black matrix 202b. For example, an overcoat film is formed in region 202a.

Based on second image data DAT2 and second control signal CS2 (such as a clock signal, a vertical synchronizing signal, and a horizontal synchronizing signal) output from image processor 300, second timing controller 240 generates second image data DA2 and various timing signals (data start pulse DSP2, data clock DCK2, gate start pulse GSP2, and gate clock GCK2) in order to control drive of second source driver 220 and second gate driver 230 (see FIG. 3). Second timing controller 240 outputs second image data DA2, data start pulse DSP2, and data clock DCK2 to second source driver 220, and outputs gate start pulse GSP2 and gate clock GCK2 to second gate driver 230.

Second source driver 220 outputs the data voltage corresponding to second image data DA2 to data lines 211 based on data start pulse DSP2 and data clock DCK2. Second gate driver 230 outputs the gate voltage to gate lines 212 based on gate start pulse GSP2 and gate clock GCK2.

The data voltage is supplied from second source driver 220 to each data line 211, and the gate voltage is supplied from second gate driver 230 to each gate line 212. The common voltage is supplied from the common driver to the common electrode. When the gate voltage (gate-on voltage) is supplied to gate line 212, TFT 213 connected to gate line 212 is turned on, and the data voltage is supplied to pixel electrode 215 through data line 211 connected to TFT 213. The electric field is generated by the difference between the data voltage supplied to pixel electrode 215 and the common voltage supplied to the common electrode. The liquid crystal is driven by the electric field to control the transmittance of light from backlight 400, thereby displaying the image. The monochrome image is displayed on second display panel 200. A known configuration can be applied to second display panel 200.

Figure 6:
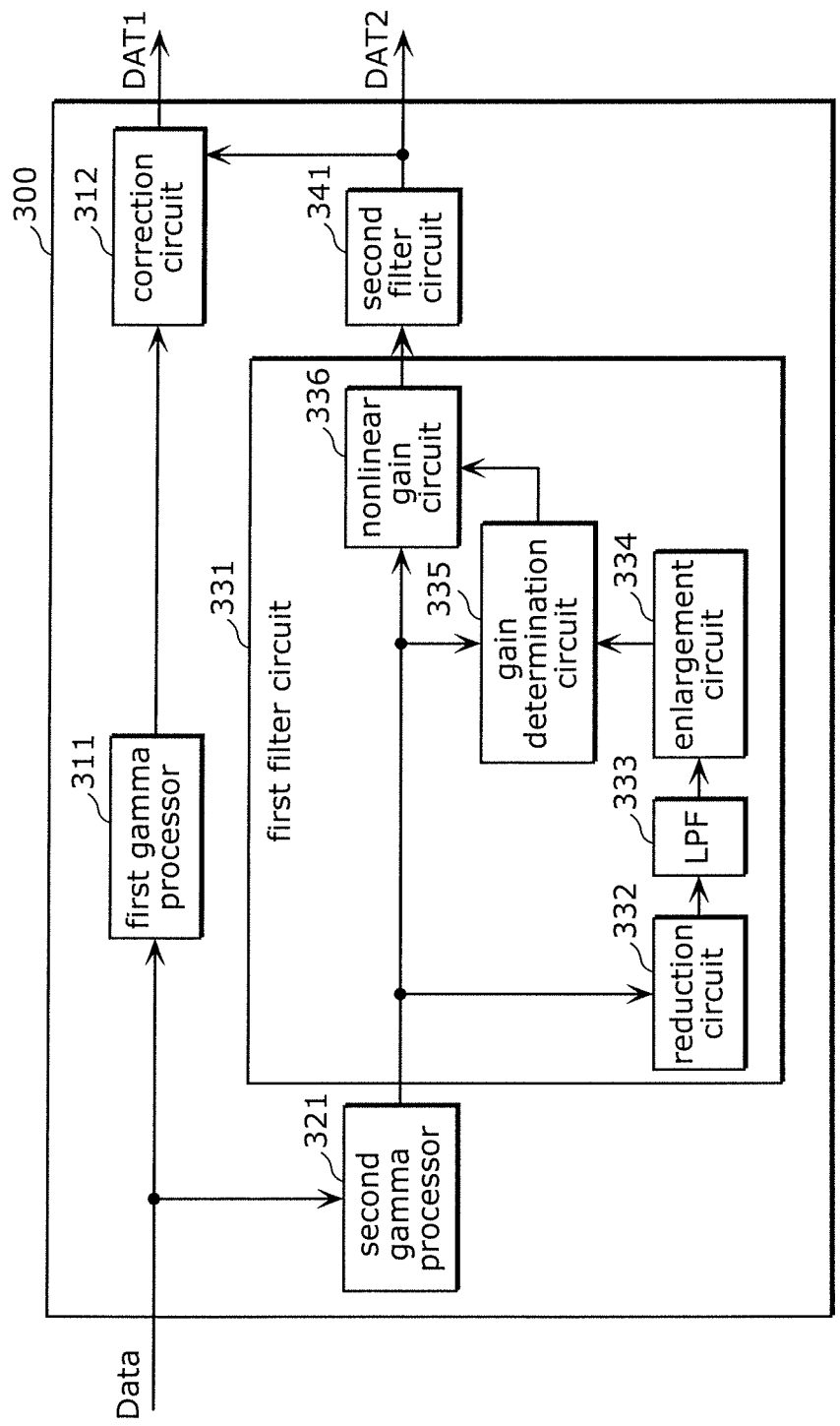
FIG. 6 is a block diagram illustrating an example of the specific configuration of image processor according to the first exemplary embodiment.

FIG. 6 is a block diagram illustrating an example of the specific configuration of image processor 300. Image processor 300 includes first gamma processor 311, correction circuit 312, second gamma processor 321, first filter circuit 331, and second filter circuit 341. In the present exemplary embodiment, first filter circuit 331 includes reduction circuit 332, low-pass filter 333, enlargement circuit 334, gain determination circuit 335, and nonlinear gain circuit 336. Based on input image data Data, image processor 300 performs the following image processing to generate first image data DAT1 (in the present exemplary embodiment, the color image data) corresponding to the first image displayed on first display panel 100 and second image data DAT2 (in the present exemplary embodiment, the monochrome image data) corresponding to the second image displayed on second display panel 200.

When image processor 300 receives input image data Data transmitted from the external system, input image data Data is transmitted to first gamma processor 311 and second gamma processor 321. For example, input image data Data includes luminance information (gradation information) and color information. The color information is one designating the color. For example, in the case that input image data Data is constructed with 8 bits, each of a plurality of colors including the red color, the green color, and the blue color can be expressed by values of 0 to 255. The plurality of colors include at least the red color, the green color, and the blue color, and may further include a W (white) color and/or a Y (yellow) color.

When acquiring input image data Data, first gamma processor 311 refers to a first gradation table to perform first gamma processing of determining the first gradation. For example, first gamma processor 311 determines the first gradation using first gamma value γ1 set based on a first gamma characteristic that is a gamma characteristic for first display panel 100. First gamma processor 311 outputs the input image data subjected to the first gamma processing to correction circuit 312.

When acquiring input image data Data, second gamma processor 321 refers to a second gradation table to perform second gamma processing of determining the second gradation. For example, second gamma processor 321 determines the second gradation using second gamma value γ2 set based on a second gamma characteristic that is a gamma characteristic for second display panel 200. Second gamma processor 321 outputs the input image data subjected to the second gamma processing to first filter circuit 331.

A method for setting first gamma value γ1 and second gamma value γ2 that are described above. For example, first gamma value γ1 and second gamma value γ2 are set such that a combined gamma value of a combined image obtained by combining the first image that is the color image and the second image that is the monochrome image is 2.2. For example, when both the first gamma characteristic of first display panel 100 and the second gamma characteristic of second display panel 200 have the gamma value of 2.2, assuming that Lm is luminance of first display panel 100 and that Ls is luminance of second display panel 200, combined luminance is given by Lm×Ls. When the combined luminance Lm×Ls is expressed by input image data Data, first gamma value γ1, and second gamma value γ2, the following equation is obtained.

$$Lm \times Ls = (Data \wedge y1) \wedge 2.2 \times (Data \wedge y2) \wedge 2.2 =$$

$$Data \wedge (y1 \times 2.2) Data \wedge (y2 \times 2.2) = Data \wedge (y1 \times 2.2 + y2 \times 2.2)$$

Thus, when first gamma value γ1 and second gamma value γ2 are set such that (γ1+γ2)=1 is obtained, the combined gamma value can be set to 2.2.

As illustrated in FIG. 6, the input image data subjected to the second gamma processing is input from second gamma processor 321 to reduction circuit 332, gain determination circuit 335, and nonlinear gain circuit 336 of first filter circuit 331.

Reduction circuit 332 performs processing of reducing an image size on the input image data. As a specific example, reduction circuit 332 reduces 256 pixels to one pixel by selecting a maximum value of the luminance in a 16-by-16 pixel region. Reduction circuit 332 outputs the input image data having the reduced image size to low-pass filter 333.

Low-pass filter 333 performs first low-pass filter processing of locally expanding a portion having a high signal level of the input image data by several pixels with respect to the input image data in order to reduce the display defect due to the parallax. For example, low-pass filter 333 multiplies the input image data by a predetermined filter coefficient to perform the processing of locally expanding the portion having the high signal level by several pixels.

In the present exemplary embodiment, because low-pass filter 333 performs the first low-pass filter processing on the input image data in which the image size is reduced by reduction circuit 332, low-pass filter 333 can simply perform the first low-pass filter processing on the large pixel region. For example, when performing the first low-pass filter processing on an 11-by-11 pixel region in the input image data in which the image size is reduced by reduction circuit 332, low-pass filter 333 can actually perform the first low-pass filter processing on a 176-by-176 image region. Low-pass filter 333 outputs the image data subjected to the first low-pass filter processing to enlargement circuit 334.

Enlargement circuit 334 performs processing of enlarging the image size on the image data subjected to the first low-pass filter processing. As a specific example, for example, enlargement circuit 334 enlarges one pixel to the 16-by-16 pixel region. A general interpolation method such as linear interpolation and bicubic interpolation can be used as a method for enlarging the image size by enlargement circuit 334. Enlargement circuit 334 outputs the image data having the enlarged pixel size to gain determination circuit 335.

In this way, reduction circuit 332 is provided in a preceding stage of low-pass filter 333 and enlargement circuit 334 is provided in a subsequent stage of low-pass filter 333, whereby a load on arithmetic processing by low-pass filter 333 can be reduced and a circuit size of low-pass filter 333 can be reduced.

By way of example, the maximum value of the luminance is selected in the predetermined pixel region when reduction circuit 332 reduces the image size. Alternatively, reduction circuit 332 may output an average value of the luminance in the predetermined pixel region. However, the configuration where reduction circuit 332 selects the maximum value of the luminance in the predetermined pixel region is desirable, because the effect that maintains the peak value of the luminance can be obtained.

Gain determination circuit 335 determines a gain using the gradation of the image data subjected to the first low-pass filter processing and the input gradation of the input image data. As a specific example, a gain value is determined according to a calculated value obtained by dividing the gradation of the image data subjected to the first low-pass filter processing by the input gradation of the input image data. In the present exemplary embodiment, gain determination circuit 335 sets the gain to 1 when the calculated value obtained by dividing the gradation of the image data subjected to the first low-pass filter processing by the input gradation of the input image data is less than 2, gain determination circuit 335 sets the gain to 2 when the calculated value is greater than or equal to 2 and less than 3, gain determination circuit 335 sets the gain to 3 when the calculated value is greater than or equal to 3 and less than 4, and gain determination circuit 335 sets the gain to 4 when the calculated value is greater than or equal to 4. Gain determination circuit 335 outputs the determined gain value to nonlinear gain circuit 336.

Figure 8:
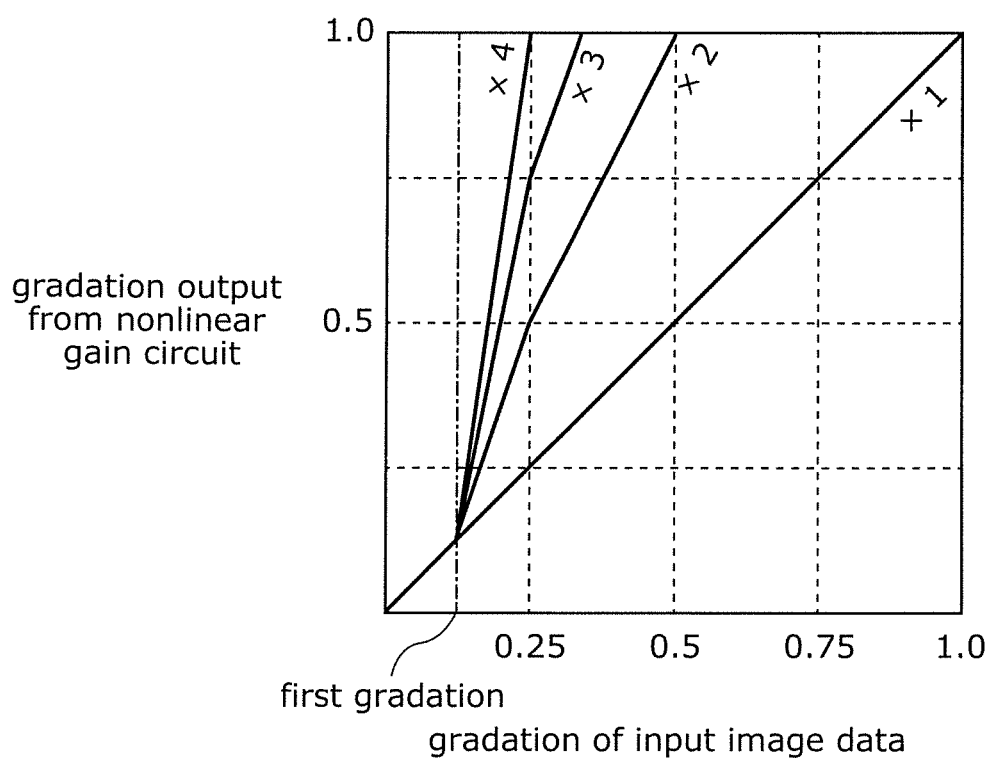
FIG. 8 is a graph illustrating the relationship between input gradation and output gradation in nonlinear gain circuit according to the first exemplary embodiment.

Nonlinear gain circuit 336 performs nonlinear gain processing on the input image data using the gain value determined by gain determination circuit 335. More specifically, as illustrated in FIG. 8, nonlinear gain circuit 336 sets an output gradation value indicated on a vertical axis according to the gain determined by gain determination circuit 335 when the input gradation of the input image data indicated on a horizontal axis is greater than or equal to the first gradation that is a predetermined value, and nonlinear gain circuit 336 sets the output gradation value using a gain less than or equal to the gain determined by gain determination circuit 335 when the input gradation of the input image data is less than the first gradation. For example, when the input gradation is less than the first gradation even if the gain value determined by gain determination circuit 335 is 3, the output gradation value is determined while the gain value is set to 1.

With this configuration, both the reduction in the display defects due to the parallax and the improvement in the contrast can be achieved. That is, nonlinear gain circuit 336 determines the output gradation value using the gain less than or equal to the gain determined by gain determination circuit 335 when the input gradation of the input image data is less than the first gradation, so that a degree of the first low-pass filter processing by low-pass filter 333 can be reduced to darkly display the portion that should be darkly displayed as compared with the case that the input gradation is greater than or equal to the first gradation. For this reason, the contrast can be improved. Nonlinear gain circuit 336 determines the output gradation value according to the gain value determined by gain determination circuit 335 when the input gradation of the input image data is greater than or equal to the first gradation, so that the effect of the first low-pass filter processing by low-pass filter 333 can be utilized to reduce the display defect due to the parallax. As a result, both the reduction in the display defect due to the parallax and the improvement in the contrast can be achieved.

In the example of FIG. 8, when the input gradation of the input image data is less than the first gradation, nonlinear gain circuit 336 determines the output gradation value while setting the gain to 1. That is, when the input gradation is less than the first gradation, an application size of the first low-pass filter processing is zero. Thus, in first filter circuit 331, when the input gradation is less than the first gradation, the application size of the first low-pass filter processing is reduced as compared with the case that the input gradation is greater than or equal to the first gradation.

Figure 9:
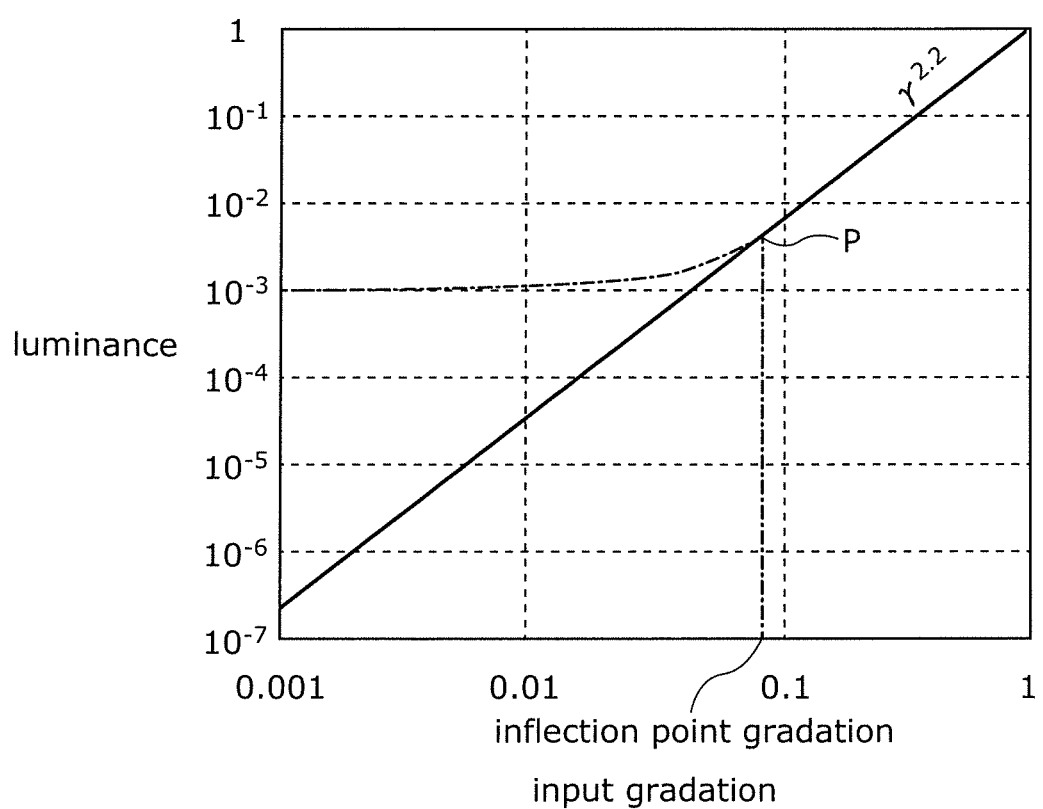
FIG. 9 is a graph illustrating the characteristic of the gamma value of 2.2, the gamma characteristic of one display panel, and the gamma characteristic in a state in which two display panels overlap each other.

Assuming that the input gradation at an inflection point where the gamma characteristic of second display panel 200 deviates from the characteristic of the gamma value of 2.2 is inflection point gradation, desirably the first gradation value is set to a range of 0.5 times to 1.5 times the inflection point gradation. FIG. 9 is a graph illustrating the characteristic of the gamma value of 2.2, the gamma characteristic of one display panel, and the gamma characteristic in a state in which two display panels overlap each other. In FIG. 9, the horizontal axis indicates the input gradation and the vertical axis indicates the luminance. In FIG. 9, a solid line indicates the characteristic of the gamma value of 2.2, an alternate long and short dash line indicates the gamma characteristic of one display panel, and an alternate long and two short dashes line indicates the gamma characteristic in the state where two display panels overlap each other. As illustrated in FIG. 9, the gamma characteristic obtained by overlapping the two display panels is close to the characteristic of the gamma value of 2.2, and the luminance of $10^{-6}$ can be expressed during the input gradation of 0.001 when the maximum luminance is set to 1. On the other hand, the gamma characteristic of the one display panel is limited to the expression of the luminance of $10^{-3}$ when the maximum luminance is set to 1, and it can be seen that the gamma characteristic of the one display panel deviates from the characteristic of the gamma value of 2.2 at the input gradation of about 0.09 in the example of FIG. 9. It is assumed that inflection point P is the point at which the gamma characteristic of the one display panel (for example, second display panel 200) deviates from the characteristic of the gamma value of 2.2, and that the inflection point gradation is the input gradation at inflection point P. This means that the gradation higher than the inflection point gradation can be expressed by the one display panel, and that the gradation lower than the inflection point gradation is hardly expressed by the one display panel. Desirably the value of the first gradation described above with reference to FIG. 8 falls within the range of 0.5 times to 1.5 times the inflection point gradation. In the present exemplary embodiment, because the inflection point gradation is 0.09, desirably the value of the first gradation ranges from 0.045 to 0.135, inclusive. The contrast can be improved by setting the value of the first gradation to 0.5 times or more the inflection point gradation, and the display defect due to the parallax can be reduced by setting the value of the first gradation to 1.5 times or less the inflection point gradation.

In the present exemplary embodiment, image processor 300 includes second filter circuit 341 that performs the second filter processing on the input image data subjected to the nonlinear gain processing in the subsequent stage of first filter circuit 331. The second filter processing may be the same low-pass filter processing as that performed by low-pass filter 333, or may be maximum value filter processing. For example, the maximum value filter processing is processing of setting the maximum value of the luminance in a predetermined pixel region centered on the target pixel to the luminance of a target pixel. As a specific example, when the 15-by-15 pixel region is set to the application size of the second filter processing, the maximum value of the luminance in the 15-by-15 pixel region centered on the target pixel is set to the luminance of the target pixel.

Second filter circuit 341 performs the second filter processing to locally expand the portion having the high signal level of the input image data by several pixels on the input image data in order to reduce the display defect due to the parallax. At this point, the application size of the second filter processing by second filter circuit 341 is smaller than the application size of the first low-pass filter processing by first filter circuit 331. For example, the application size of the first low-pass filter processing by first filter circuit 331 is set to the 176-by-176 pixel region, and the application size of the second filter processing by second filter circuit 341 is set to the 15-by-15 pixel region. With this configuration, the display defect due to the parallax can be reduced by performing the second filter processing even on the low-gradation region less than or equal to the first gradation that is not affected by the effect of the first low-pass filter processing in first filter circuit 331. At that point, the application size of the second filter processing by second filter circuit 341 is reduced smaller than the application size of the first low-pass filter processing by first filter circuit 331, and the second filter processing in the low-gradation region is performed within the limited pixel region, which allows security of the effect of improving the contrast.

The term "the application size of the first low-pass filter processing by first filter circuit 331" is not limited to the pixel region of the first low-pass filter processing performed by low-pass filter 333. That is, as described above, when the input image data is reduced by reduction circuit 332 such that the 16-by-16 pixel region is reduced to one pixel, low-pass filter 333 actually performs the first low-pass filter processing on the 176-by-176 pixel region when performing the first low-pass filter processing on the 11-by-11 pixel region in the reduced input image data. Thus, for example, when first filter circuit 331 includes reduction circuit 332 at a preceding stage of low-pass filter 333, the application size of the first low-pass filter processing corresponding to the pre-reduction image data is set to "the application size of the first low-pass filter processing by first filter circuit 331".

Second filter circuit 341 outputs the image data subjected to the second filter processing to second timing controller 240 as second image data DAT2, and also outputs the image data subjected to the second filter processing to correction circuit 312.

When acquiring the image data subjected to the second filter processing, correction circuit 312 corrects the input image data subjected to the first gamma processing by first gamma processor 311 according to the correction of the gradation of the image data by first filter circuit 331 and second filter circuit 341. As a specific example, correction circuit 312 calculates a correction coefficient by dividing the input image data subjected to the second gamma processing by second gamma processor 321 by the image data output from second filter circuit 341. Correction circuit 312 corrects the input image data subjected to the first gamma processing by multiplying the input image data by the correction coefficient. When image processor 300 does not include second filter circuit 341, correction circuit 312 corrects the correction coefficient by dividing the input image data subjected to the second gamma processing by the image data output from first filter circuit 331. Correction circuit 312 corrects the input image data subjected to the first gamma processing by multiplying the input image data by the correction coefficient. Correction circuit 312 outputs the image data corrected in this way to first timing controller 140 as first image data DAT1.

Figure 7:
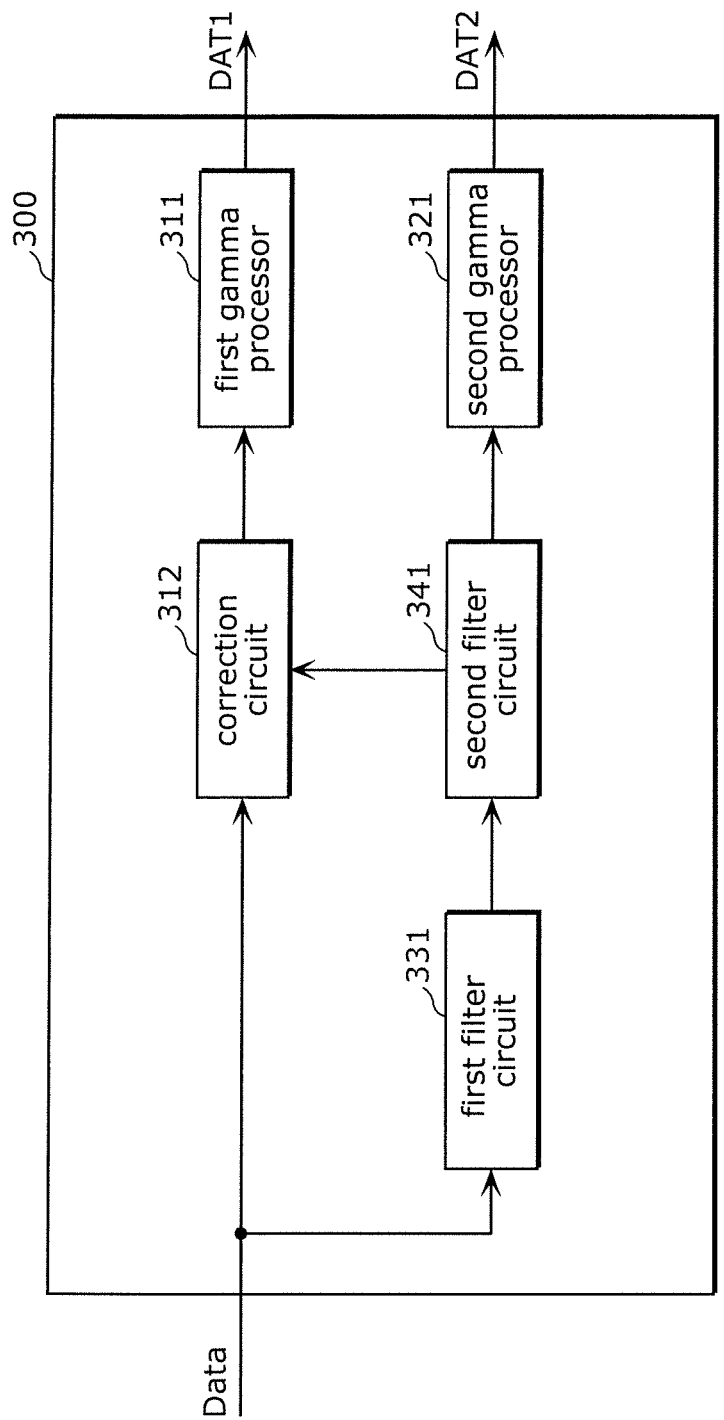
FIG. 7 is a block diagram illustrating an example of the specific configuration of image processor according to another example of the first exemplary embodiment.

In the present exemplary embodiment, by way of example, first gamma processor 311 is disposed at the preceding stage of correction circuit 312, and second gamma processor 321 is disposed at the preceding stage of first filter circuit 331. Alternatively, as illustrated in FIG. 7, first gamma processor 311 may be disposed at the subsequent stage of correction circuit 312, and second gamma processor 321 may be disposed at the subsequent stage of first filter circuit 331 and second filter circuit 341. In this case, correction circuit 312 calculates the correction coefficient by dividing input image data Data by the image data output from first filter circuit 331 (or second filter circuit 341), and multiplies input image data Data by the correction coefficient.

Figure 10:
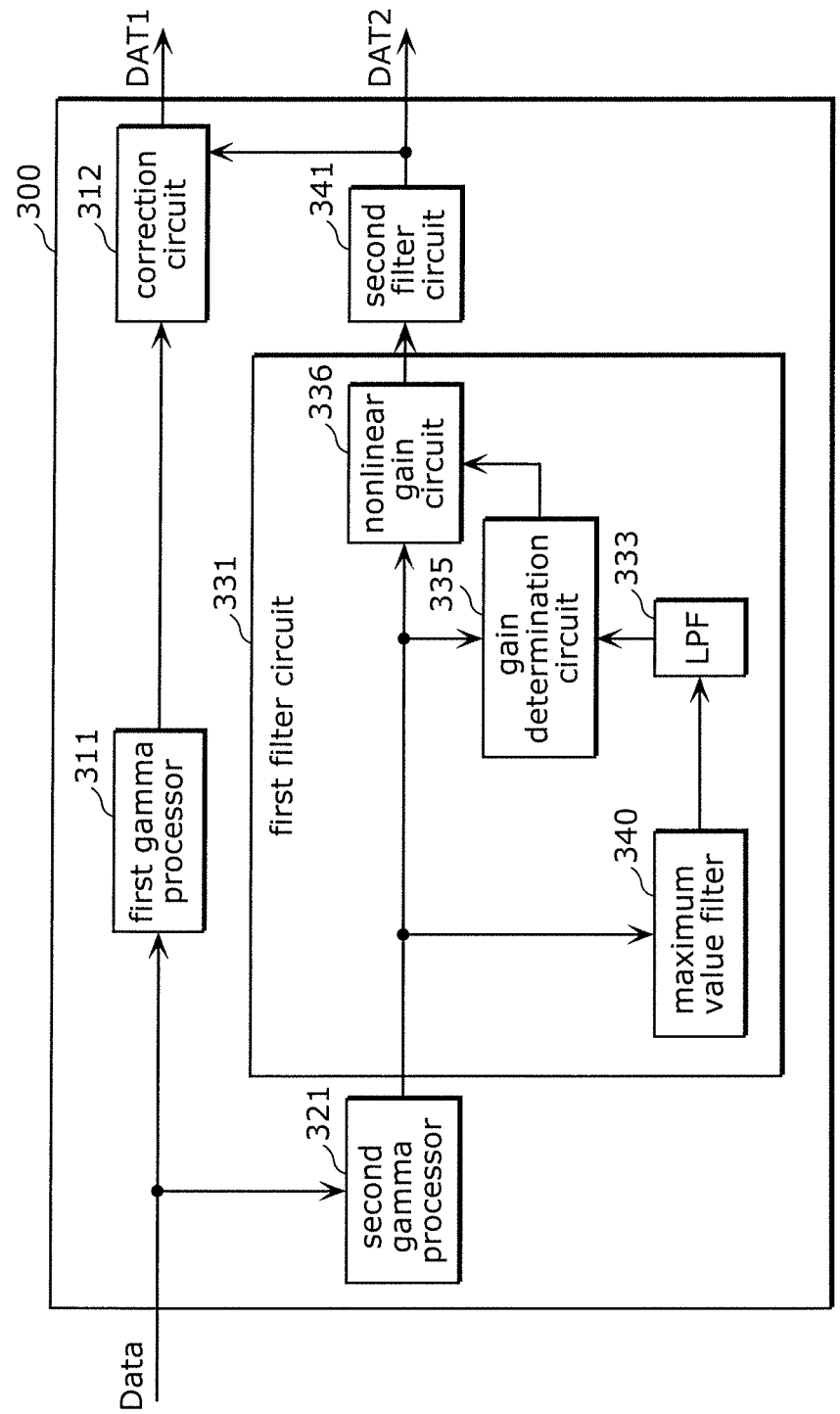
FIG. 10 is a block diagram illustrating an example of the specific configuration of image processor according to another example of the first exemplary embodiment.

In the example of FIG. 6, first filter circuit 331 includes reduction circuit 332 and enlargement circuit 334. Alternatively, first filter circuit 331 may include no reduction circuit 332 and no enlargement circuit 334. As illustrated in FIG. 10, when maximum value filter 340 that performs the maximum value filter processing on the input image data is provided at the preceding stage of low-pass filter 333, the effect of maintaining the peak value of the luminance can be obtained.

Second Exemplary Embodiment

The configuration of first filter circuit 331 is not limited to the configuration described above with reference to FIGS. 6 and 10. In a second exemplary embodiment of FIG. 11, first filter circuit 331 does not include gain determination circuit 335 and nonlinear gain circuit 336 described above with reference to FIGS. 6 and 10, but instead includes ratio determination circuit 337 and blend circuit 338.

Figure 12:
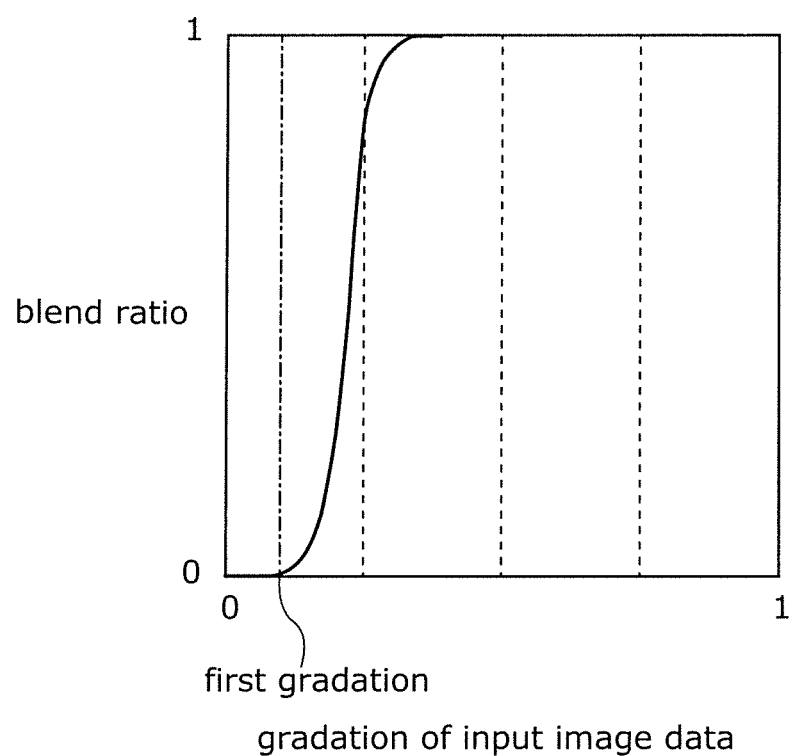
FIG. 12 is a schematic graph illustrating the relationship between input gradation and blend ratio in ratio determination circuit according to the second exemplary embodiment.

Ratio determination circuit 337 determines a blend ratio of the image data subjected to the first low-pass filter processing and input image data in blend circuit 338. FIG. 12 is a schematic graph illustrating a method for determining the blend ratio by ratio determination circuit 337. In FIG. 12, the horizontal axis indicates the input gradation of the input image data, and the vertical axis indicates the blend ratio of the image data subjected to the first low-pass filter processing. As illustrated in FIG. 12, when the input gradation of the input image data is less than the first gradation, ratio determination circuit 337 sets the blend ratio of the image data subjected to the first low-pass filter processing to a small value as compared with the case that the input gradation is greater than or equal to the first gradation. Ratio determination circuit 337 increases the blend ratio with increasing input gradation, and sets the blend ratio to 1 when the input gradation becomes greater than or equal to 0.3. Ratio determination circuit 337 outputs the determined blend ratio to blend circuit 338.

Blend circuit 338 blends the input image data and the image data subjected to the first low-pass filter processing according to the blend ratio determined by ratio determination circuit 337. As described above, when the input gradation of the input image data is less than the first gradation, ratio determination circuit 337 sets the blend ratio of the image data subjected to the first low-pass filter processing to the small value as compared with the case that the input gradation is greater than or equal to the first gradation. When the input gradation is less than the first gradation, because blend circuit 338 blends the image data subjected to the first low-pass filter processing at a low blend ratio, the degree of the first low-pass filter processing is small in the image data output from blend circuit 338. The blend ratio of the image data subjected to the first low-pass filter processing increases with increasing input gradation, and the degree of the first low-pass filter processing increases in the image data output from blend circuit 338.

With this configuration, both the reduction in the display defects due to the parallax and the improvement in the contrast can be achieved. That is, when the input gradation of the input image data is less than the first gradation, because blend circuit 338 blends the image data subjected to the first low-pass filter processing at the low blend ratio, the degree of the first low-pass filter processing is small in the image data output from blend circuit 338. As a result, the portion that should be darkly displayed can be darkly displayed, and the contrast can be improved. When the input gradation of the input image data is greater than or equal to the first gradation, because blend circuit 338 blends the image data subjected to the first low-pass filter processing at the high blend ratio, the degree of the first low-pass filter processing is large in the image data output from blend circuit 338. As a result, the effect of the first low-pass filter processing by low-pass filter 333 can be utilized to reduce the display defect due to the parallax. As a result, both the reduction in the display defect due to the parallax and the improvement in the contrast can be achieved.

In the second exemplary embodiment of FIG. 12, when the input gradation of the input image data is less than the first gradation, ratio determination circuit 337 sets the blend ratio of the image data subjected to the first low-pass filter processing to zero. That is, when the input gradation is less than the first gradation, an application size of the first low-pass filter processing is zero. Thus, in first filter circuit 331, when the input gradation is less than the first gradation, the application size of the first low-pass filter processing is reduced as compared with the case that the input gradation is greater than or equal to the first gradation.

Assuming that the input gradation at inflection point P where the gamma characteristic of second display panel 200 deviates from the characteristic of the gamma value of 2.2 in FIG. 9 is the inflection point gradation, desirably the first gradation value in FIG. 12 is set to the range of 0.5 times to 1.5 times the inflection point gradation.

Figure 11:
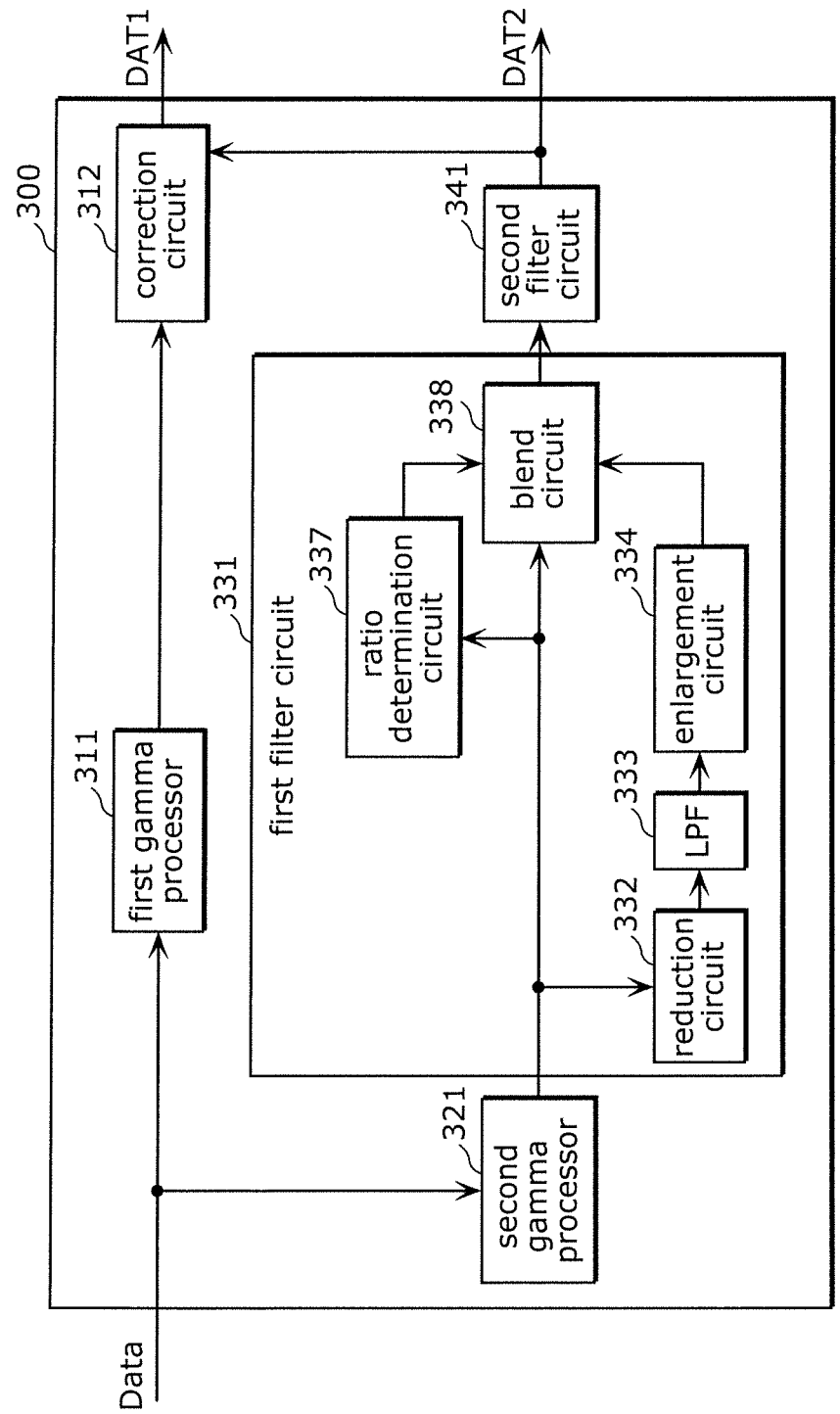
FIG. 11 is a block diagram illustrating an example of the specific configuration of image processor according to the second exemplary embodiment.

As illustrated in FIG. 11, image processor 300 may further include second filter circuit 341 that performs the second filter processing on the input image data subjected to the blend processing by blend circuit 338 in the subsequent stage of first filter circuit 331. The same configuration of second filter circuit 341 as that described above with reference to FIG. 6 in the first exemplary embodiment can be adopted. In this case, as described above in the first exemplary embodiment, desirably the application size of the second filter processing by second filter circuit 341 is smaller than the application size of the first low-pass filter processing by first filter circuit 331.

Figure 13:
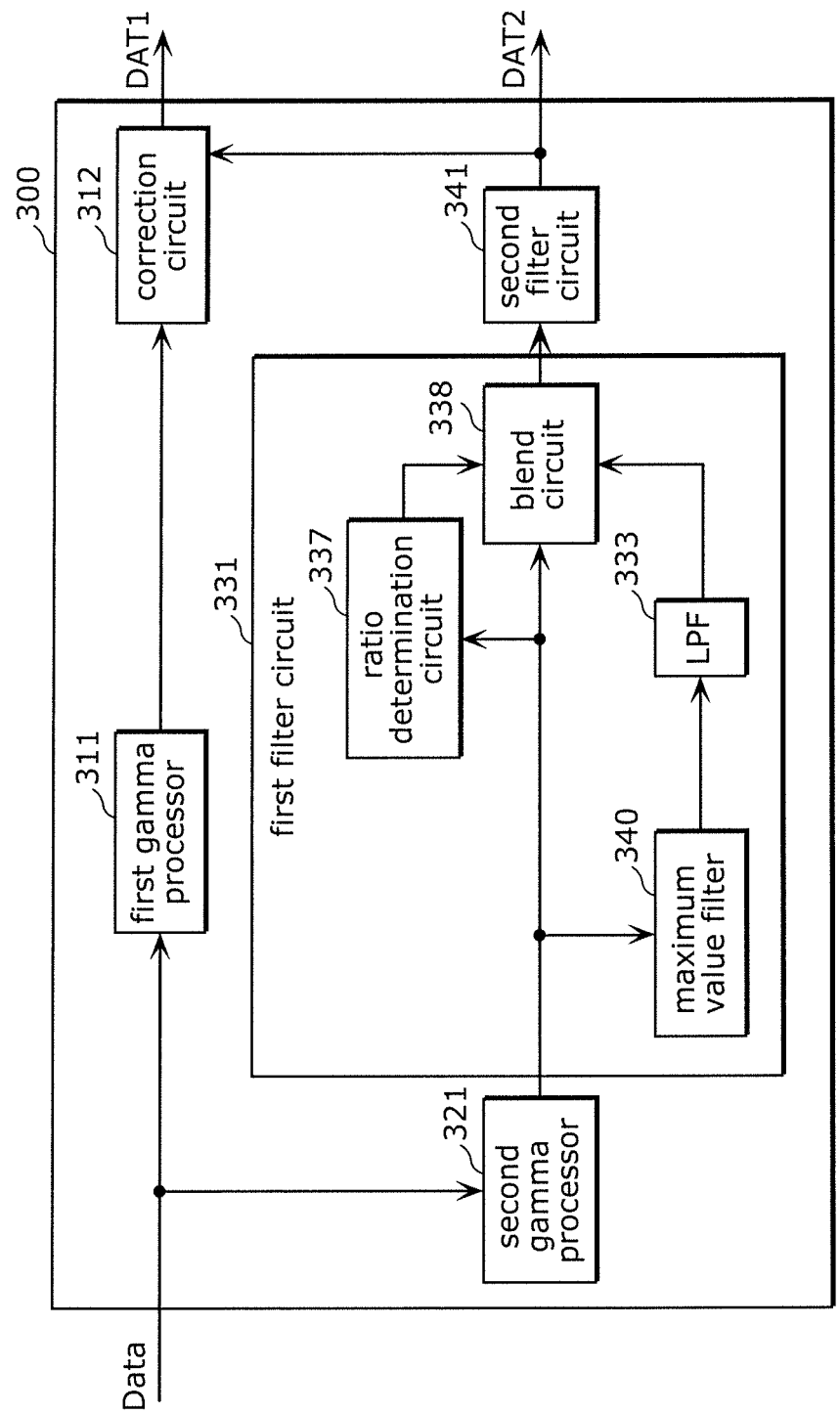
FIG. 13 is a block diagram illustrating an example of the specific configuration of image processor according to another example of the second exemplary embodiment.

In the second exemplary embodiment in FIG. 11, first filter circuit 331 may include no reduction circuit 332 and no enlargement circuit 334. As illustrated in FIG. 13, when maximum value filter 340 that performs the maximum value filter processing on the input image data is provided at the preceding stage of low-pass filter 333, the effect of maintaining the peak value of the luminance can be obtained.

Also in the second exemplary embodiment in FIG. 11, as illustrated in FIG. 7, first gamma processor 311 may be disposed at the subsequent stage of correction circuit 312, and second gamma processor 321 may be disposed at the subsequent stage of first filter circuit 331 and second filter circuit 341. In this case, correction circuit 312 calculates the correction coefficient by dividing input image data Data by the image data output from first filter circuit 331 (or second filter circuit 341), and multiplies input image data Data by the correction coefficient.

Third Exemplary Embodiment

Figure 14:
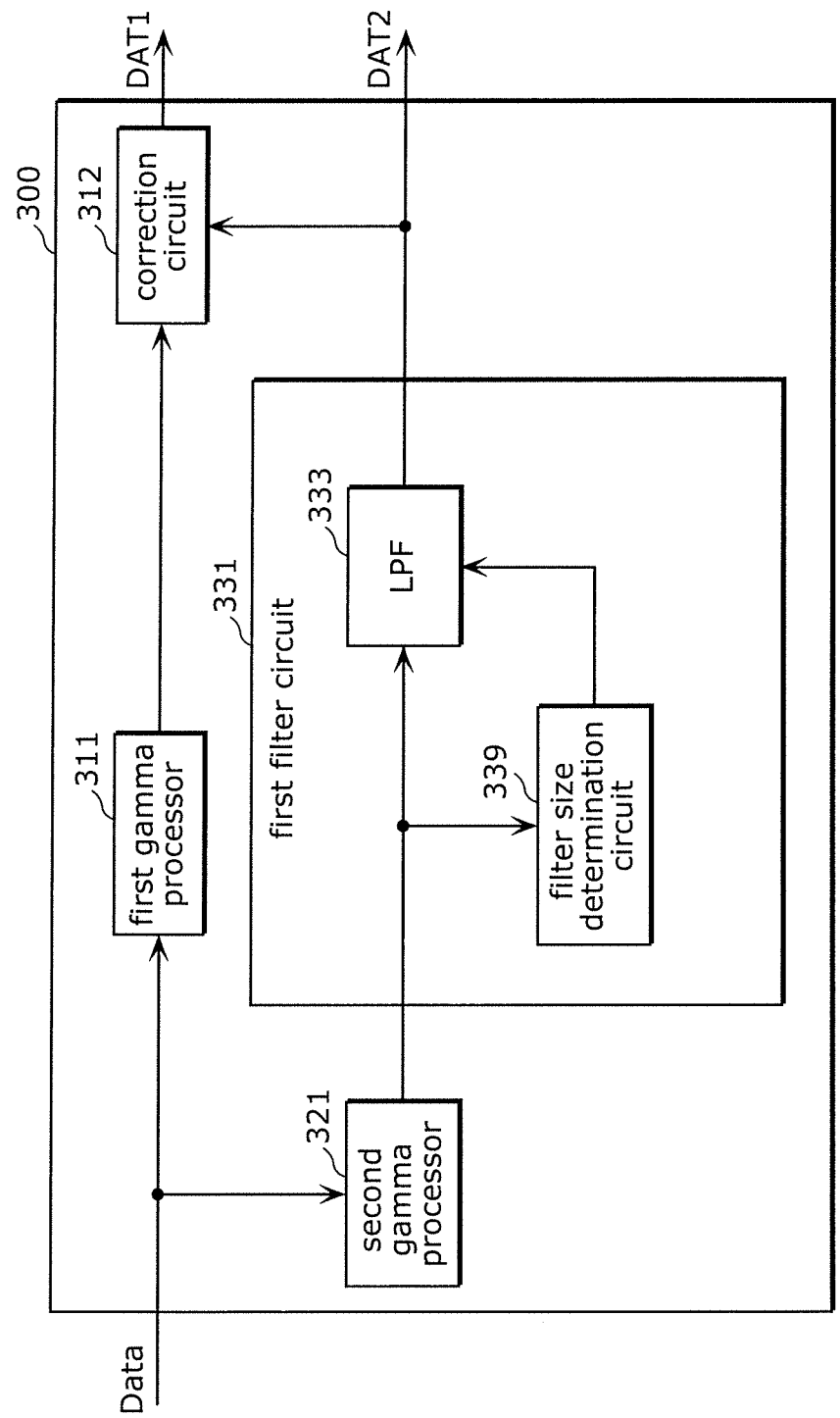
FIG. 14 is a block diagram illustrating an example of the specific configuration of image processor according to the third exemplary embodiment.

In a third exemplary embodiment in FIG. 14, first filter circuit 331 includes low-pass filter 333 and filter size determination circuit 339.

Figure 15:
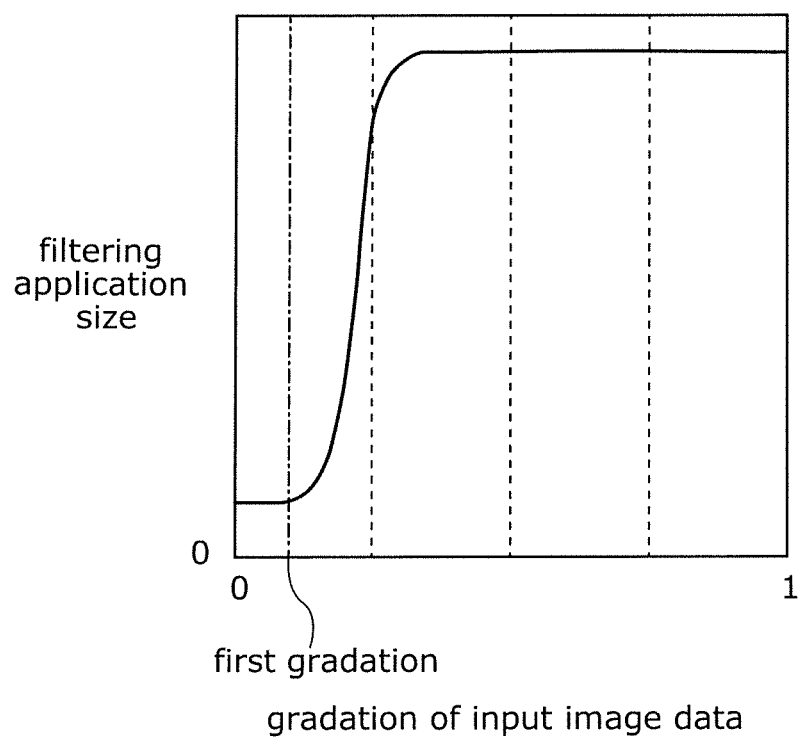
FIG. 15 is a schematic graph illustrating the relationship between input gradation and application size of the first low-pass filter processing in filter size determination circuit according to the third exemplary embodiment.

Filter size determination circuit 339 determines the application size of first low-pass filter processing. As used herein, the application size of the filter processing refers to the number of pixels referred to in the filter processing performed by the filter. For example, when low-pass filter 333 performs the first low-pass filter processing on N-by-N pixels around the target pixel, N×N is the application size of the first low-pass filter processing. FIG. 15 is a schematic graph illustrating a method for determining the application size of the first low-pass filter processing by filter size determination circuit 339. In FIG. 15, the horizontal axis indicates the input gradation of the input image data, and the vertical axis indicates the application size of the first low-pass filter processing. As illustrated in FIG. 15, when the input gradation of the input image data is less than the first gradation, filter size determination circuit 339 sets the application size of the first low-pass filter processing to a small value as compared with the case that the input gradation is greater than or equal to the first gradation. Filter size determination circuit 339 increases the application size of the first low-pass filter processing with increasing input gradation. Filter size determination circuit 339 outputs the determined application size to low-pass filter 333.

Low-pass filter 333 performs the first low-pass filter processing on the input image data according to the application size determined by filter size determination circuit 339. As described above, when the input gradation of the input image data is less than the first gradation, filter size determination circuit 339 sets the application size of the first low-pass filter processing to the small value as compared with the case that the input gradation is greater than or equal to the first gradation. For this reason, when the input gradation of the input image data is less than the first gradation, the application size of the first low-pass filter processing is reduced as a whole of first filter circuit 331 as compared with the case that the input gradation is greater than or equal to the first gradation.

With this configuration, both the reduction in the display defects due to the parallax and the improvement in the contrast can be achieved. That is, when the input gradation of the input image data is less than the first gradation, low-pass filter 333 performs the first low-pass filter processing with the relatively small application size. As a result, even if the pixel has the high luminance in the periphery, the portion that should be darkly displayed can be darkly displayed, and the contrast can be improved. When the input gradation of the input image data is greater than or equal to the first gradation, low-pass filter 333 performs the first low-pass filter processing with the relatively large application size. As a result, the effect of the first low-pass filter processing by low-pass filter 333 can be utilized to reduce the display defect due to the parallax. As a result, both the reduction in the display defect due to the parallax and the improvement in the contrast can be achieved.

The first low-pass filter processing by low-pass filter 333 with the relatively small application size in the case of the input gradation less than the first gradation may be regarded as first low-pass filter processing of a small degree. The first low-pass filter processing by low-pass filter 333 with the relatively large application size in the case of the input gradation greater than or equal to the first gradation may be regarded as first low-pass filter processing of a large degree.

Assuming that the input gradation at inflection point P where the gamma characteristic of second display panel 200 deviates from the characteristic of the gamma value of 2.2 in FIG. 9 is the inflection point gradation, desirably the first gradation value in FIG. 15 is set to the range of 0.5 times to 1.5 times the inflection point gradation.

Figure 16:
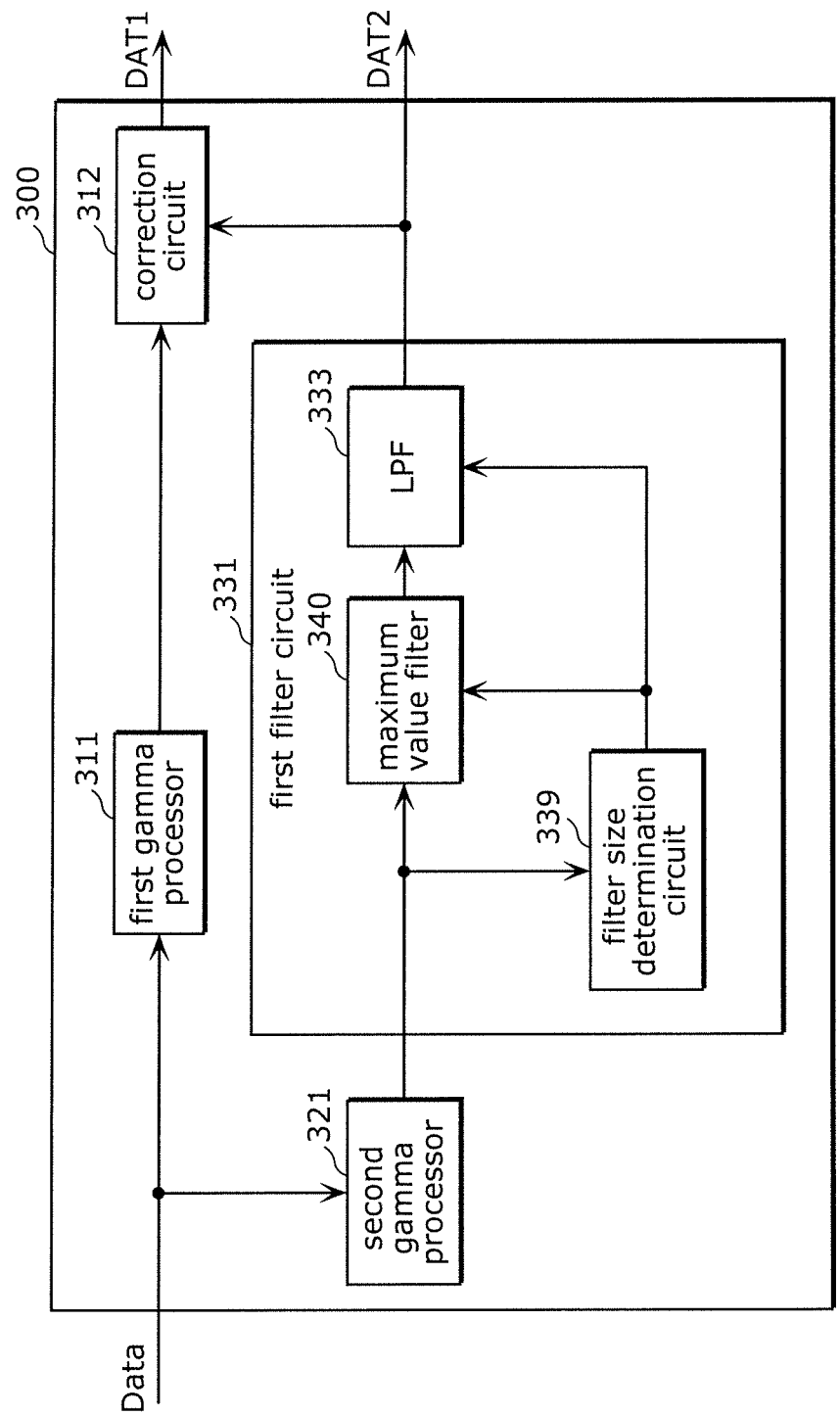
FIG. 16 is a block diagram illustrating an example of the specific configuration of image processor according to another example of the third exemplary embodiment.

As illustrated in FIG. 16, when maximum value filter 340 that performs the maximum value filter processing on the input image data is provided at the preceding stage of low-pass filter 333, the effect of maintaining the peak value of the luminance can be obtained. Desirably maximum value filter 340 changes the application size of the maximum value filter processing according to the output value of filter size determination circuit 339. For example, when filter size determination circuit 339 outputs a large output value relating to the application size of the first low-pass filter processing, maximum value filter 340 desirably enlarges the application size of the maximum value filter processing according to the large output value. When filter size determination circuit 339 outputs a small output value related to the application size of the first low-pass filter processing, maximum value filter 340 desirably reduces the application size of the maximum value filter processing according to the small output value.

Figure 17:
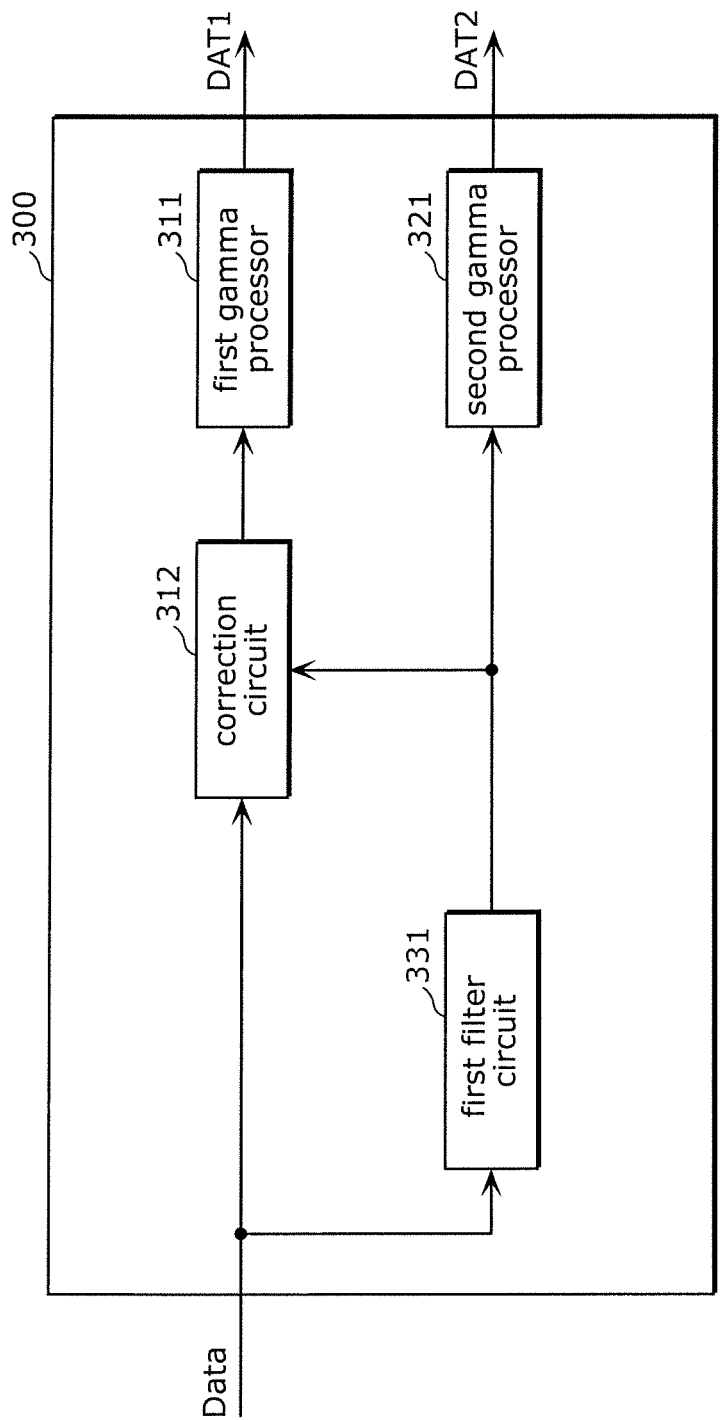
FIG. 17 is a block diagram illustrating an example of the specific configuration of image processor according to another example of the first exemplary embodiment.

As illustrated in FIG. 17, first gamma processor 311 may be disposed at the subsequent stage of correction circuit 312, and second gamma processor 321 may be disposed at the subsequent stage of first filter circuit 331. In this case, correction circuit 312 calculates the correction coefficient by dividing input image data Data by the image data output from first filter circuit 331, and multiplies input image data Data by the correction coefficient.

In the above, the specific embodiments of the present application have been described, but the present application is not limited to the above-mentioned embodiments, and various modifications may be made as appropriate without departing from the spirit of the present application.

What is claimed is:

1. A display device in which a plurality of display panels are disposed to overlap each other and an image is displayed on each of the display panels, the display device comprising:
   a first display panel that displays a first image;
   a second display panel disposed on a back surface side of the first display panel to display a second image; and
   an image processor that acquires input image data and generates first image data corresponding to the first image and second image data corresponding to the second image based on the input image data,
   wherein
   the image processor includes a first filter circuit that performs first low-pass filter processing on the input image data, and
   the first filter circuit reduces a degree of the first low-pass filter processing when input gradation of the input image data is less than first gradation as compared with a case that the input gradation is greater than or equal to the first gradation.

2. The display device according to claim 1, wherein when the input gradation at an inflection point where a gamma characteristic of the second display panel deviates from a characteristic of a gamma value of 2.2 is assumed to be inflection point gradation, the first gradation falls within a range of 0.5 times to 1.5 times the inflection point gradation.

3. The display device according to claim 1, wherein the first filter circuit includes:
   a low-pass filter that performs the first low-pass filter processing on the input image data;
   a gain determination circuit that determines a gain using gradation of the image data subjected to the first low-pass filter processing and the input gradation of the input image data; and
   a nonlinear gain circuit that performs nonlinear gain processing on the input image data,
   the nonlinear gain circuit determines an output gradation value according to the gain determined by the gain determination circuit when the input gradation of the input image data is greater than or equal to the first gradation, and
   the nonlinear gain circuit determines an output gradation value using a gain less than or equal to the gain determined by the gain determination circuit when the input gradation of the input image data is less than the first gradation.

4. The display device according to claim 3, wherein the nonlinear gain circuit determines the output gradation value with the gain set to 1 when the input gradation of the input image data is less than the first gradation.

5. The display device according to claim 3, further comprising:
   a reduction circuit disposed at a preceding stage of the low-pass filter to reduce an image size of the input image data; and
   an enlargement circuit disposed at a subsequent stage of the low-pass filter to expand the image size of the image data subjected to the first low-pass filter processing,
   wherein the reduction circuit selects a maximum value of the input gradation in a predetermined region when reducing the image size.

6. The display device according to claim 3, further comprising a maximum value filter disposed at a preceding stage of the low-pass filter,
   wherein the maximum value filter sets a maximum value of luminance in a predetermined pixel region centered on a target pixel in the input image data to a luminance of the target pixel.

7. The display device according to claim 3, wherein
   the image processor includes a second filter circuit that performs second filter processing on the input image data subjected to the nonlinear gain processing in a subsequent stage of the first filter circuit, and
   an application size of the second filter processing by the second filter circuit is smaller than an application size of the first low-pass filter processing by the first filter circuit.

8. The display device according to claim 1, wherein the first filter circuit includes:
- a low-pass filter that performs the first low-pass filter processing on the input image data;
- a ratio determination circuit that determines a blend ratio of the image data subjected to the first low-pass filter processing and the input image data; and
- a blend circuit that blends the input image data and the image data subjected to the first low-pass filter processing according to the blend ratio determined by the ratio determination circuit, and
- the ratio determination circuit sets the blend ratio of the image data subjected to the first low-pass filter processing to a small value when the input gradation of the input image data is less than the first gradation as compared with a case that the input gradation is greater than or equal to the first gradation.

9. The display device according to claim 8, wherein the ratio determination circuit sets the blend ratio of the image data subjected to the first low-pass filter processing to zero when the input gradation of the input image data is less than the first gradation.

10. The display device according to claim 1, wherein the first filter circuit reduces an application size of the first low-pass filter processing when the input gradation of the input image data is less than the first gradation as compared to a case that the input gradation is greater than or equal to the first gradation.

11. The display device according to claim 10, wherein the first filter circuit includes:
- a filter size determination circuit that determines the application size of the first low-pass filter processing; and
- a low-pass filter that performs the first low-pass filter processing on the input image data with the application size determined by the filter size determination circuit.

12. A display device in which a plurality of display panels are disposed to overlap each other and an image is displayed on each of the display panels, the display device comprising:
- a first display panel that displays a first image;
- a second display panel that is disposed on a back surface side of the first display panel to display a second image; and
- an image processor that acquires input image data and generates first image data corresponding to the first image and second image data corresponding to the second image based on the input image data, wherein the image processor includes a first filter circuit that performs first low-pass filter processing on the input image data, and the first filter circuit reduces an application size of the first low-pass filter processing when input gradation of the input image data is less than first gradation as compared with a case that the input gradation is greater than or equal to the first gradation.

* * * * *